May 30, 1961 — R. E. STOKELY — 2,986,022
CONSTANT VELOCITY JOINT
Filed Jan. 26, 1960 — 2 Sheets-Sheet 1
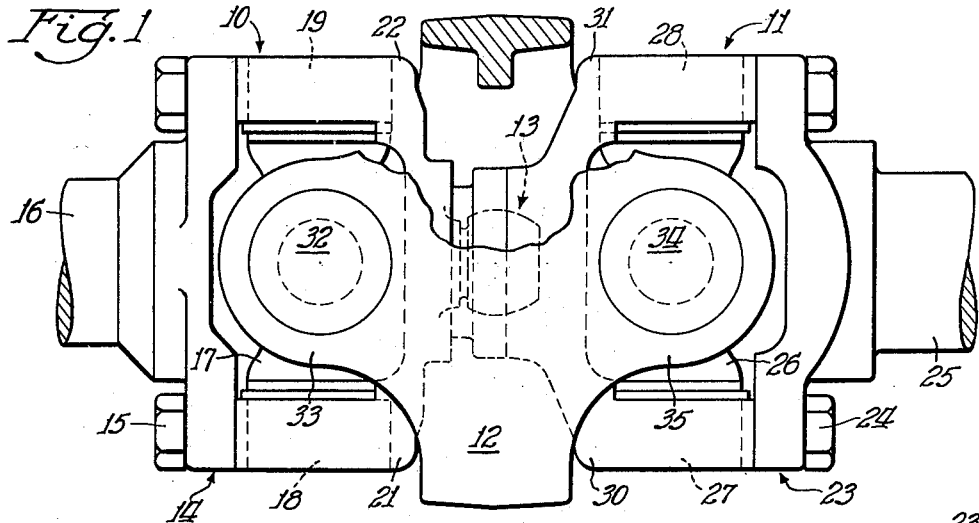
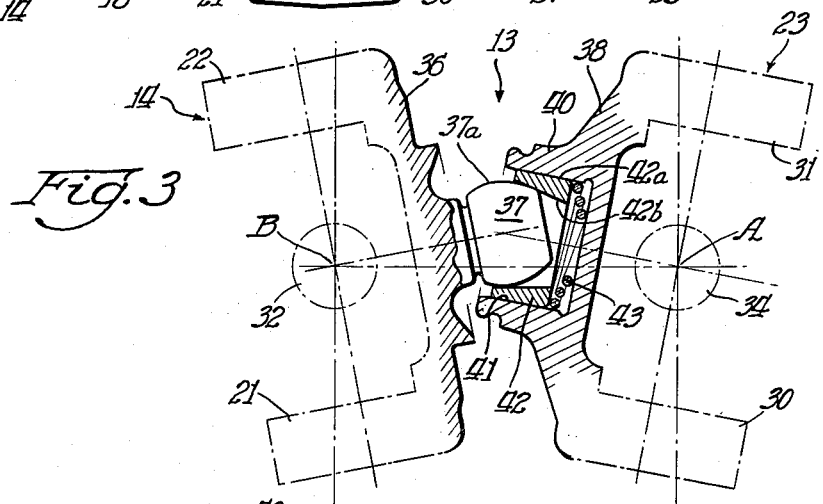
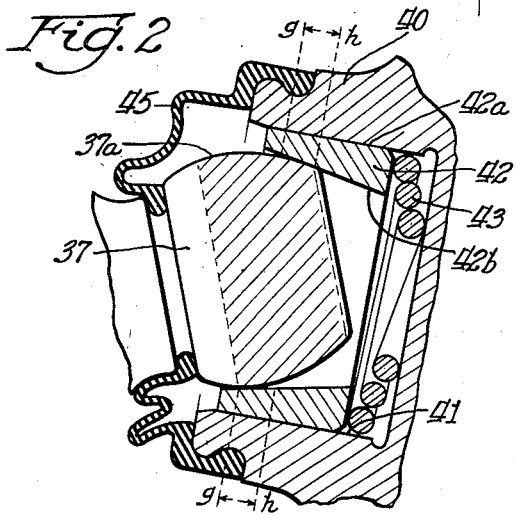
Inventor:
Raymond E. Stokely
By: W. S. McCurry, Atty.

May 30, 1961 R. E. STOKELY 2,986,022
CONSTANT VELOCITY JOINT
Filed Jan. 26, 1960 2 Sheets-Sheet 2

Inventor:
Raymond E. Stokely
By: W. S. McCurry Atty.

United States Patent Office 2,986,022
Patented May 30, 1961

2,986,022
CONSTANT VELOCITY JOINT

Raymond E. Stokely, Rockford, Ill., assignor to Borg-Warner Corporation, Chicago, Ill., a corporation of Illinois Filed Jan. 26, 1960, Ser. No. 4,636
7 Claims. (Cl. 64—21)

This invention relates to universal joints and more particularly to an improved centering device for a double universal joint.

There is disclosed in Dodge Patent 2,255,762 a centering device for a constant velocity universal joint. The Dodge centering device comprises a spherical ball swivel-fitted in a socket contained in a cylindrical socket member. The socket member has a close working fit in a cylindrical recess provided in the cross head of the joint, and a compression spring between the cross head and the socket member urges the socket member toward the spherical ball. During angular displacement of yokes of the universal joint the spherical ball will swivel or move angularly in the cylindrical socket member and at the same time the socket member will slide axially in its recess. Consequently, the surfaces of the Dodge centering device which are subject to wear are the ball and socket surfaces and the surfaces of the cylindrical socket member and the walls of its cylindrical recess.

Due to the uncompensated wear between the socket member and its cylindrical recesses of the prior art device, which led to excessive noise and vibrations, it was necessary to replace the entire cross head.

It is, therefore, a primary object of this invention to provide a double universal joint, particularly of the double Cardan type, wherein the centering device construction is adapted to permit the ball to operably move both angularly in any direction and axially relative to its socket, thereby obviating any need for movement between the socket member and its recess.

Another object of the present invention is to improve the centering device of the prior art so as to eliminate the wear on the surfaces between the socket member or equivalent insert and its recess.

Another object of the invention is to provide an improved centering device having means for both compensating wear between the engaging surfaces of the ball and socket and compensating for wear between the socket member and its recess.

Although it is desirable to have the socket member be a separate insert so that it may be urged to take up slack due to wear between the ball and socket surfaces, it is not desirable to have the insert move back and forth for each revolution of the drive shaft connected to the double joint. Such cyclic rubbing leads inevitably to a short operating life for the joint since destructive vibrations are gradually set up. It is therefore, a more particular object of this invention, that the centering device have an outer surface contoured with respect to the inner surface of the socket so that yokes of the double joint may assume an angular disposition relative to each other with necessitating movement of the insert to accommodate such movement. A specific feature of this invention comprises the forming of the ball outer surface by the generation of a line consisting of a progression of segmental curves and the forming of the socket inner surface by similarly generating a selected line, the surfaces being curved with respect to each other so that the ball maintains tangency with the socket at least at two opposite radial portions while accommodating angular and axial movement of the ball within the socket.

Other and more particular objects, uses, and advantages of this invention will become apparent upon a reading of the following specification taken in connection with the accompanying drawing which forms a part thereof wherein:

Fig. 1 is a longitudinal plan view, partly broken away, of a universal joint embodying the invention;

Fig. 2 is an enlarged sectional view showing in detail the centering device including the wear surfaces;

Fig. 3 is a cross-sectional view showing the centering device displaced to its maximum angularity;

Figure 4:
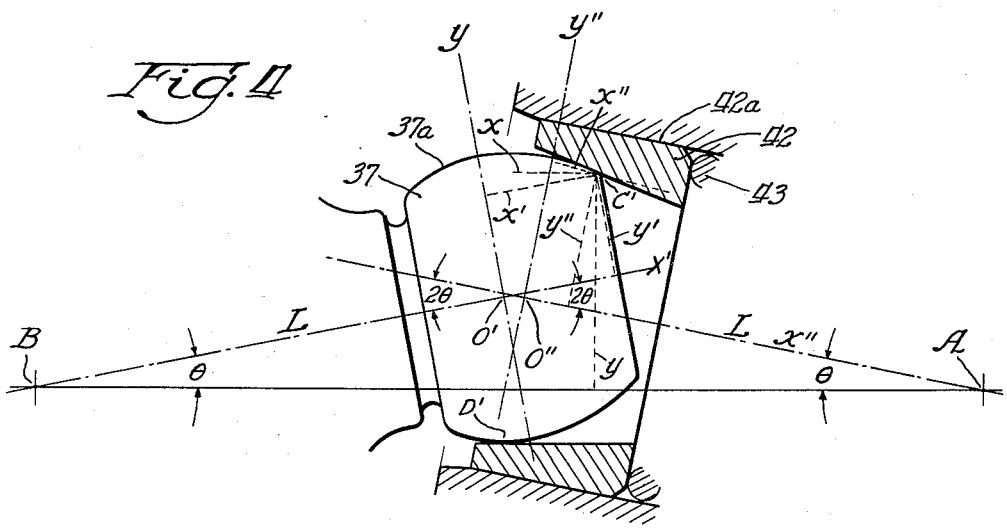
Fig. 4 is a cross-sectional view showing the centering device displaced to its maximum angularity and having superimposed thereon a coordinate system which is used in determining the surfaces of the insert and ball.

Referring to the drawing there is disclosed in Fig. 1 a pair of universal joints 10 and 11 operatively connected by means of a transmission ring 12 and a centering device 13.

The universal joint 10 comprises a yoke 14 connected by means of bolts 15 to a torque transmitting shaft 16. The yoke 14 receives a cross 17 having oppositely extending trunnions 18 and 19 which are disposed in suitable bearings provided on the arms 21 and 22 respectively of the yoke. The universal joint 11 comprises a yoke 23 connected by bolts 24 to a torque transmitting shaft 25. The joint 11 also contains a cross 26 and trunnions 27 and 28 disposed in arms 30 and 31 respectively of the yoke 23.

The cross 17 is also provided with a pair of trunnions 32 which are suitably journalled in a pair of ears 33 of the transmission ring 12. Likewise, the cross 26 is provided with a pair of trunnions 34 which are journalled in a pair of ears 35 on the opposite side of the transmission ring 12.

The centering device 13, see Fig. 3, is provided between the yokes 14 and 23. A bridge 36 on the yoke 14 connects the arms 21 and 22 and has formed thereon a ball or male element 37 whose center is in axial alignment with the axis of shaft 16. The ball 37 has an outer surface 37a formed as a surface of revolution generated by the revolution of a selected line, here shown in Figs. 1–6 as comprising a progression of segmental curves. A bridge 38 on the yoke 23 connects the arms 30 and 31 and has formed thereon a socket portion 40. The socket portion 40, shown enlarged in Fig. 4, is provided with a cylindrical bore 41 having an axis in alignment with the axis of shaft 25 and is adapted for slidably receiving a socket or insert 42. The insert 42 has an outer surface 42a having a sliding fit with the inner surface of the bore 41. The insert 42 has an inner surface 42b receiving the outer surface of the ball and formed as a surface of revolution generated by the revolution of a selected line. The insert 42 is held statically in place axially by means of a spring 43, one side of which abuts against the insert and the other side of which seats in the bottom of the bore 41. The insert is urged by the spring to automatically take up slack due to wear between surfaces 37a and 42b. The insert 42 is held in place radially by its sliding fit in the bore 41. A flexible boot 45 is suitably attached to the bridge 36 and 38 for the purpose of retaining lubricant within the centering device 13. The boot 45 is preferably made of rubber or rubber-like material.

The centering device 13 is provided so as to maintain equal angularity between the two torque transmitting shafts 16 and 25. It is necessary to maintain equal angularity between the shafts 16 and 25 in order to obtain constant velocity operation (as is well known in the art).

In operation, the ball 37 exerts a force against the socket 42 which is balanced by a force exerted by the spring 43 through the socket 42 and against the ball 37. The spring, therefore, forces the ball and socket to make contact at all times.

To minimize wear between the socket or insert 42 and recess 41 within the yoke 38 it is necessary that axial movement of the socket within the recess be substantially eliminated.

The foregoing requirements of equal angularity between shafts 16 and 25 and of no axial displacement of the socket within its recess for any angle of operation are met by the proper contouring of the ball with respect to the inner surface 42b of the socket.

In theory it is immaterial whether the ball is contoured with respect to the socket or vice versa but for purposes of manufacture it is preferable to select first a configuration for the inner surface 42b of the socket. Moreover, for simplicity, it is preferable to make this a frustum of a cone and it is desirable to make the apex angle equal to the maximum range of operating angle. It then remains to determine the required contour of the portion of the ball making contact with the socket throughout the maximum operating range of angularity. To contour the ball for angularities beyond the maximum operating range would not affect performance but would normally make unnecessary manufacturing expense.

Figure 5:
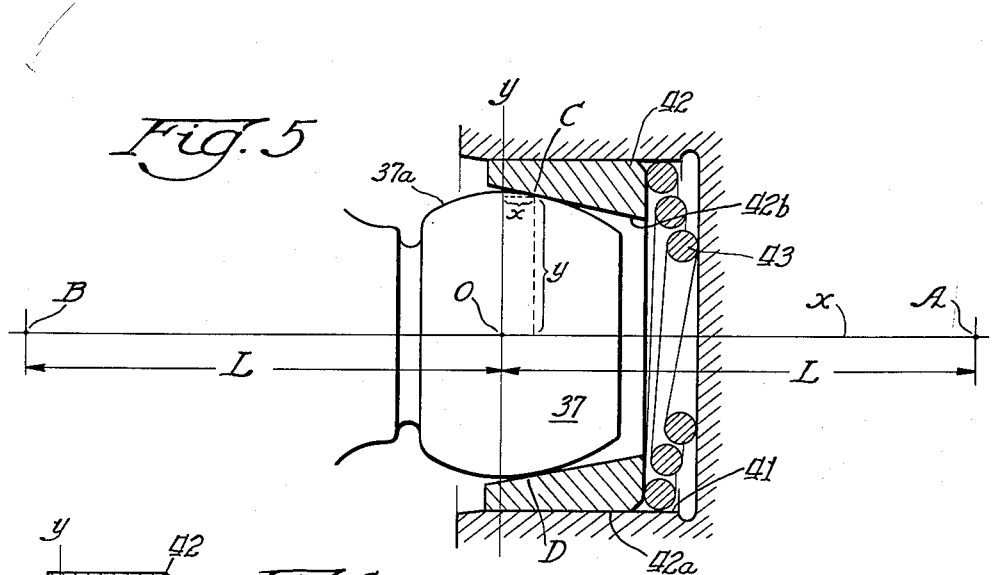
Fig. 5 is similar to Fig. 4 but showing the centering device in its neutral position.

To further illustrate the operation of ball and socket, Cartesian coordinates are superimposed on Figures 4 and 5. In Figure 4 the coordinate system $x'$, $y'$ with origin at $O'$ moves with the ball 37 as it rotates about the fixed point B. In like manner the coordinate system $x''$, $y''$ with origin at $O''$ moves with the socket 42 as it rotates about the fixed point A. In the neutral position shown in Figure 5 both $O'$ and $O''$ coincide with a point O which is on a line, half way between points A and B, and both coordinate systems coincide with the fixed coordinate system $x$, $y$. In this neutral position the contact between the surfaces 37a and 42b is a complete circular ring and indicated in Figure 5 by points C and D. When not in the neutral position as shown by Figure 4 the contact is theoretically at two points only and these are shown as C' and D'. The angular displacements of the ball and the socket with respect to the line AB are equal in magnitude but opposite in direction. This is the requirement for uniform transmission of velocity between shafts 16 and 25.

The procedure of finding the required contour of the ball for a given contour of socket which has been selected for a given application so as to meet the requirements of (a) uniform velocity transmission and (b) no axial displacement of the socket will now be explained.

The problem is:

Given: $y''=f_2(x'')$ The selected curve which generates the surface 42b by rotating about the $x''$ axis.

To find: $y'=f_1(x')$ which generates the surface 37a by rotating about the $x'$ axis such that the two curves will have a common point of tangency for any operating angle.

The unknown function $y'=f_1(x')$ may be represented to any desired accuracy within the range of interest by the polynomial expression:

$$y' = L\sum_{n=0}^{m} A_n \left(\frac{x'}{L}\right)^n \qquad (1)$$

For the usual range of angularity and required accuracy five terms in the series will be adequate, i.e., $$A_0 + A_1\frac{x'}{L} + A_2\left(\frac{x'}{L}\right)^2 + A_3\left(\frac{x'}{L}\right)^3 + A_4\left(\frac{x'}{L}\right)^4$$

The solution will be complete when numerical values for the A's are found. These may be found to any desired accuracy by successive approximation by the following procedure:

(1) Choose as many different $\theta$'s in the range of operation as A's i.e., $(m+1)\theta$'s.

(2) For each $\theta$ make a guess as to the point of tangency on the socket, i.e., pairs of values of $y''$, $x''$ in accord with the given relation $$y''=f_2(x'') \qquad (2)$$

(3) Compute the slope $dy''/dx''$ from Equation 2 for each $\theta$. If the conical slope is used as suggested this slope will be constant for all $\theta$'s.

(4) Compute $x'$, $y'$ and $dy'/dx'$ for each $\theta$ from the relations:

$$x'=x'' \cos 2\theta + y'' \sin 2\theta - L(1+\cos 2\theta - 2\cos\theta) \qquad (3)$$

$$y'=y'' \cos 2\theta - x'' \sin 2\theta + L(\sin 2\theta - 2\sin\theta) \qquad (4)$$

$$\frac{dy'}{dx'} = \frac{\frac{dy''}{dx''} - \tan 2\theta}{1 + \frac{dy''}{dx''}\tan 2\theta} \qquad (5)$$

(5) Write Equation 1 for each $\theta$ position using the previously computed $x'$, $y'$ and solve the resulting set of linear simultaneous equations for the A's.

(6) Evaluate the expression $$\frac{dy'}{dx'} - \sum_{n=1}^{m} nA_n\left(\frac{x'}{L}\right)^{n-1} \qquad (6)$$

for each $\theta_i$. This expression should be designated $R_i$.

(7) Evaluate the sum $$S = \sum (R_i)^2 \qquad (7)$$

(8) Make a new guess as to the point of tangency for one $\theta$ position and repeat all computations in 4 to 7 obtaining a new value of S in Equation 7.

(9) Make new guesses in a systematic manner for each $\theta$ position in turn toward making the sum S as small as possible. The smaller the sum S the more accurate the solution.

The final values for the A's when substituted into Equation 1 give the required curve $y'=f_1(x')$ defining the proper contour of 37a of the ball 37.

Figure 6:
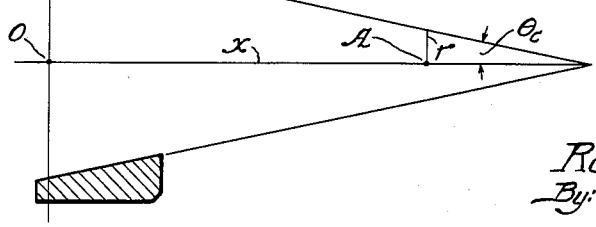
Fig. 6 is a cross-sectional view of the socket showing the angle thereof.

As a preferred example, the curve $$y''=r+(L-x'') \tan \theta_c$$

was assumed with the values, where $r$ is a vertical distance shown on Fig. 6, and $\theta_c$ is the angle of the socket.

$r=0.158$
$L=1.40625$
$\theta_c=11°$

Taking for the five $\theta$'s the values $-11°, -5.5°, 0°, 5.5°, 11°$, the solution for the five A's was:

$A_0=0.301966$
$A_1=-0.01121$
$A_2=-1.983030$
$A_3=4.711073$
$A_4=-9.039790$

By substituting the five A's in the polynomial expression, the following points were determined for the angular displacements listed:

$\theta = -11°$ $\quad x' = -.062$
$\qquad\qquad y' = .419$
$\theta = -5.5°$ $\quad x' = -.004$
$\qquad\qquad y' = .424$
$\theta = 0°$ $\quad x' = .077$
$\qquad\qquad y' = .416$
$\theta = 5.5°$ $\quad x' = .200$
$\qquad\qquad y' = .380$
$\theta = 11°$ $\quad x' = .320$
$\qquad\qquad y' = .318$ From the foregoing description taken in conjunction with the drawing disclosure, it can be seen that there has been provided a "ball and socket" centering device for a universal joint wherein there is substantially no axial movement of the socket in its recess. In Fig. 2 the area of contact or wear surface on the socket or insert 42 is indicated by the line g—h and the area of contact or wear surface on the ball 37 is shaded. These areas of contact are for the full operating conditions of the centering device when it is rotated and changes angularity from 0° to maximum angularity (22° in the preferred embodiment). There is no wear on the surface 42a of the insert 42 or on the surfaces of the bore 41.

Although the preferred embodiment has been illustrated by a construction wherein the socket 40 is contained in a slidable insert, it should be readily understood, for purposes of this invention, that manufacturing tolerances may be held at a high level and wear between surfaces 37a and 42b are ignored so that a slidable insert is not required. In such a construction the socket or female surface may be contained on the socket portion 40.

While I have described my invention in connection with one specific embodiment thereof, it is to be understood that this is by way of illustration and not by way of limitation and the scope of my invention is defined solely by the appended claims which should be construed as broadly as the prior art will permit.

I claim:

1. A universal joint comprising a driving member and a driven member, means drivingly connecting said members, a socket movably mounted on one of said members, a ball on the other of said members, said socket receiving said ball, resilient means on one of said members urging said socket and said ball into one another whereby surfaces of said ball contact surfaces of said socket, the contacting surfaces of said ball and socket being surfaces of revolution formed by curves that satisfy the equations:

(1) $x' = x'' \cos 2\theta + y'' \sin 2\theta - L(1 + \cos 2\theta - 2 \cos \theta)$
(2) $y' = y'' \cos 2\theta - x'' \sin 2\theta + L(\sin 2\theta - 2 \sin \theta)$ (3) $\dfrac{dy'}{dx'} = \dfrac{\dfrac{dy''}{dx''} - \tan 2\theta}{1 + \dfrac{dy''}{dx''} \tan 2\theta}$ (4) $y' = f'(x') = L \sum_{n=0}^{m} A_n \left(\dfrac{x'}{L}\right)^n$ (5) $\dfrac{dy'}{dx'} - \sum_{n=1}^{m} n A_n \left(\dfrac{x'}{L}\right)^{n-1} = 0$ wherein:

$x'$ and $y'$, and $x''$ and $y''$ are points in the $x'y'$ and $x''y''$ coordinate systems, respectively, $\theta$ is any angle within the operating range of the joint, $dy'/dx'$ is the slope of the curve, at any point, that defines the surface 37a of the ball 37, $dy''/dx''$ is the slope of the curve at any point that defines the inner surface 42b of the socket 42, $A_n$ are the coefficients in the polynomial $$A_0 + A_1 x + A_2 x^2 + A_3 x^3 + \ldots + A_n x^n$$

(In the solution of this polynomial $x'/L$ is substituted for each $x$ so that the coefficients are independent of the dimensions chosen), and the largest integer $m$ used in the solution is determined by the degree of accuracy required.

2. In a universal joint assembly, the combination with a pair of universal joints, a pair of yoke assemblies and an intermediate transmission member providing a driving connection between said joints, of means for centering the driving yoke member of one of said joints comprising a ball provided on one of said yoke members, a socket provided in the other yoke member for reception of said ball, resilient means on one of said members urging said socket and said ball into one another whereby surfaces of said ball contact surfaces of said socket, the contacting surfaces of said ball and socket being surfaces of revolution formed by curves that satisfy the equations:

(1) $x' = x'' \cos 2\theta + y'' \sin 2\theta - L(1 + \cos 2\theta - 2 \cos \theta)$
(2) $y' = y'' \cos 2\theta - x'' \sin 2\theta + L(\sin 2\theta - 2 \sin \theta)$ (3) $\dfrac{dy'}{dx'} = \dfrac{\dfrac{dy''}{dx''} - \tan 2\theta}{1 + \dfrac{dy''}{dx''} \tan 2\theta}$ (4) $y' = f'(x') = L \sum_{n=0}^{m} A_n \left(\dfrac{x'}{L}\right)^n$ (5) $\dfrac{dy'}{dx'} - \sum_{n=1}^{m} n A_n \left(\dfrac{x'}{L}\right)^{n-1} = 0$ wherein:

$x'$ and $y'$, and $x''$ and $y''$ are points in the $x'y'$ and $x''y''$ coordinate systems, respectively, $\theta$ is any angle within the operating range of the joint, $dy'/dx'$ is the slope of the curve, at any point, that defines the surface 37a of the ball 37, $dy''/dx''$ is the slope of the curve at any point that defines the inner surface 42b of the socket 42, $A_n$ are the coefficients in the polynomial $$A_0 + A_1 x + A_2 x^2 + A_3 x^3 + \ldots + A_n x^n$$

(In the solution of this polynomial $x'/L$ is substituted for each $x$ so that the coefficients are independent of the dimensions chosen), and the largest integer $m$ used in the solution is determined by the degree of accuracy required.

3. In a universal joint, the combination of a pair of yoke assemblies, one yoke of the assembly being connected on a transverse axis with a transmission ring, the other yoke of the assembly also being connected to the transmission ring, centering means for the yokes comprising interfitting ball and socket members, said ball member comprising an axial extension on one of said yokes and said socket member comprising insert mounted within a cylindrical recess in the other of said yokes, resilient means urging said socket into engagement with said ball, said ball being contoured with respect to said socket and said socket having a tapered inside diameter whereby upon a change in the angularity of the yokes said ball will move within said tapered socket and said socket will remain stationary axially with respect to its cylindrical recess.

4. In a universal joint assembly of the constant angular velocity type having driving and driven members interconnected by a pair of universal joints with one axis of each joint being held in fixed relative spacial relation, a centering device for guiding the angular relationship between said members, comprising: a first support means drivingly connected to said driving member; a male element fixedly mounted on said first support means in axial alignment with said driving member and having an outer surface generated by a first revolved line; second support means drivingly connected to said driven member; a female element fixedly mounted on said second support means in axial alignment with said driven member and having an inner surface generated by a second line revolved about an axis thereof, said inner surface receiving said outer surface to maintain tangency therewith at least at two radially opposite portions, said first line being comprised of a progression of segmental curves forming a configuration so that said outer surface formed thereby maintains tangency with said inner surface at least at opposite radial portions thereof while accommodating both angular and axial movement of said male element within said female element.

5. In a universal joint, a centering device as in claim 4, in which said inner surface of said female element is a conical surface generated by a straight line and said outer surface of said male element is generated by a line comprised of a progression of segmental curves each curve becoming larger proceeding toward the outermost extremity of said male element so that said first line becomes gradually flatter.

6. In a universal joint, a centering device as in claim 4, in which both said lines are comprised of a progression of segmental curves forming said inner and outer surfaces which maintain tangency therebetween at least at radially opposite portions thereof while accommodating both angular and axial movement of said element within said female element.

7. A universal joint assembly of the constant angular velocity type, comprising: a drive member; a first yoke drivingly connected to said drive member; a first cross having trunions arranged on perpendicular axes and having trunions on one axis being received by said first yoke for pivotal movement therein; a driven member; a second yoke drivingly connected to said driven member; a second cross having trunions arranged on perpendicular axes and having trunions on one axis being received in said second yoke; a connecting member formed as an annular ring having flanges extending outwardly from each side thereof to receive the trunions of each cross arranged on the other axis thereof, said connecting member holding said trunions on said other axes in a fixed spacial relation during transmission of power through said universal joint assembly; and a centering device for guiding the angular relationship between said members so that upon angular movement of one member, the other will move an equal angular displacement, a male element fixedly mounted on said first yoke in axial alignment with said drive member and a female element fixedly mounted on said second yoke in axial alignment with said driven member, said male element having a greater mass penetrating said female element as the driving and driven members are aligned, said male element having an outer surface generated by a first revolved line and said female element having an inner surface generated by a second revolved line, said inner surface receiving said outer surface to maintain tangency therewith at least at two radially opposite portions, said first line being comprised of a progression of segmental curves forming a configuration so that said outer surface formed thereby maintains tangency with said inner surface at least at opposite radial portions thereof while accommodating both annular and axial movement of said male element within said female element.

References Cited in the file of this patent
UNITED STATES PATENTS

| | | |
|---|---|---|
| 1,774,679 | Swenson | Sept. 2, 1930 |
| 2,067,286 | Pearce | Jan. 12, 1937 |
| 2,255,762 | Dodge | Sept. 16, 1941 |